(12) United States Patent
Wardle (10) Patent No.: US 9,439,011 B2
(45) Date of Patent: Sep. 6, 2016

(54) WEARABLE SPEAKER USER DETECTION

(71) Applicant: Plantronics, Inc., Santa Cruz, CA (US)

(72) Inventor: Glenn Wardle, Swindon (GB)

(73) Assignee: Plantronics, Inc., Santa Cruz, CA (US)

( * ) Notice: Subject to any disclaimer, the term of this patent is extended or adjusted under 35 U.S.C. 154(b) by 314 days.

(21) Appl. No.: 14/060,909

(22) Filed: Oct. 23, 2013

(65) Prior Publication Data

US 2015/0110280 A1 Apr. 23, 2015

(51) Int. Cl.
*H04R 29/00* (2006.01)
*H04M 3/42* (2006.01)
*H04M 3/51* (2006.01)
*H04M 1/60* (2006.01)

(52) U.S. Cl.
CPC ........... *H04R 29/00* (2013.01); *H04M 1/6058* (2013.01); *H04M 3/42365* (2013.01); *H04M 3/5175* (2013.01); *H04M 2250/12* (2013.01)

(58) Field of Classification Search
CPC ................ H04M 2250/12; H04M 1/72538; H04M 2201/40; H04M 2250/02; H04M 3/42365; H04M 3/5232; H04M 1/6058; H04M 3/5175; G01P 1/07; H04W 4/22; H04R 29/00; H04R 1/1041; H04R 1/1066; H04R 2420/07; H04R 2420/09; H04R 2430/00

USPC ........... 381/58, 332, 57, 71.1, 71.6, 73.1, 74
See application file for complete search history.

(56) References Cited

U.S. PATENT DOCUMENTS

| | | |
|---|---|---|
| 6,118,878 A | 9/2000 | Jones |
| 6,704,428 B1 | 3/2004 | Wurtz |
| 6,965,669 B2 | 11/2005 | Bickford et al. |
| 2007/0076897 A1 | 4/2007 | Philipp |
| 2008/0080705 A1 | 4/2008 | Gerhardt et al. |
| 2009/0227853 A1* | 9/2009 | Wijesiriwardana  A61B 5/02427 600/324 |
| 2014/0378083 A1* | 12/2014 | Kannappan ......... H04W 76/007 455/404.1 |

FOREIGN PATENT DOCUMENTS

| | | |
|---|---|---|
| JP | 2008-161429 A | 7/2008 |
| WO | WO 01/63888 A1 | 8/2001 |

* cited by examiner

*Primary Examiner* — Akelaw Teshale
(74) *Attorney, Agent, or Firm* — Richard A. Dunning, Jr.

(57) ABSTRACT

Apparatus having corresponding methods and computer-readable media comprise: a speaker interface configured to provide audio to a wearable speaker of a headset and to receive speaker return signals generated by from the wearable speaker of the headset; and a user detection module configured to determine a user-related parameter based on the speaker return signals received by the speaker interface from the wearable speaker of the headset.

23 Claims, 6 Drawing Sheets

WEARABLE SPEAKER USER DETECTION

FIELD

The present disclosure relates generally to the field of audio processing. More particularly, the present disclosure relates to determining when a wearable speaker is being worn by a user.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In a contact center environment, a call should only be transferred to an agent if the agent is actually present, and ready to take the call. A major issue with contact centers is the problem of "dead calls" where an in-progress call is transferred to an agent who is unavailable. In some jurisdictions, legal sanctions may be applied to a call center for having a large number of dead calls.

Some conventional approaches for detecting whether an agent is available involve determining whether the agent is logged into his or her call station. However, these approaches fail to account for an agent that is logged in, but has stepped away from the call station.

Other conventional approaches involve detecting the presence of the agent's headset. For wired headsets, these approaches generally involve some form of electrical test to determine whether the headset is plugged into the agent's call station. For wireless headsets, these approaches generally involve detecting a wireless connection to the headset. However, these approaches fail to account for an agent that has removed his or her headset.

SUMMARY

In general, in one aspect, an embodiment features an apparatus comprising: a speaker interface configured to provide audio to a wearable speaker of a headset and to receive speaker return signals generated by from the wearable speaker of the headset; and a user detection module configured to determine a user-related parameter based on the speaker return signals received by the speaker interface from the wearable speaker of the headset.

Embodiments of the apparatus can include one or more of the following features. In some embodiments, the user-related parameter indicates whether or not the headset wearable speaker is being worn by a user, and the apparatus further comprises: a user present module configured to provide a user present indication responsive to the user detection module determining that the headset wearable speaker is being worn. Some embodiments comprise an audio switch configured to provide the audio to the speaker interface responsive to the user present indication. In some embodiments, the user detection module comprises: a heartbeat module configured to detect a heartbeat of the user based on the speaker return signals received by the speaker interface from the wearable speaker of the headset; wherein the user detection module determines the user-related parameter based on the heartbeat detected by the heartbeat module. Some embodiments comprise a heart rate module configured to determine a heart rate of the user based on the heartbeat of the user. Some embodiments comprise a user stress module configured to determine a stress level of the user based on the heart rate of the user. Some embodiments comprise a call module configured to provide i) an indication of the stress level of the user, and ii) identification information for a call handled by the user. Some embodiments comprise the a headset, wherein the headset comprises the wearable speaker, and the user detection module. In some embodiments, the audio is first audio, and the headset further comprises: a microphone configured to provide second audio to the speaker interface. Some embodiments comprise a call management system configured to monitor a health of the user based on a plurality of the heart rates of the user.

In general, in one aspect, an embodiment features a method comprising: providing audio to a wearable speaker of a headset; receiving speaker return signals generated by the wearable speaker of the headset; and determining a user-related parameter based on the speaker return signals generated by the wearable speaker of the headset.

Embodiments of the method can include one or more of the following features. In some embodiments, the user-related parameter indicates whether or not the headset wearable speaker is being worn by a user, the method further comprising: providing a user present indication responsive to determining that the headset wearable speaker is being worn by the user. Some embodiments comprise switching a call to the headset providing the audio to the speaker interface responsive to the user present indication. Some embodiments comprise detecting a heartbeat of the user based on the speaker return signals generated by the wearable speaker of the headset. Some embodiments comprise determining a heart rate of the user based on the heartbeat of the user. Some embodiments comprise determining a stress level of the user based on the heart rate of the user. Some embodiments comprise providing an indication of the stress level of the user; and providing identification information for a call handled by the user. Some embodiments comprise monitoring a health of the user based on a plurality of the heart rates of the user.

In general, in one aspect, an embodiment features computer-readable media embodying instructions executable by a computer to perform functions comprising: determining a user-related parameter based on speaker return signals generated by a wearable speaker of a headset.

Embodiments of the apparatus can include one or more of the following features. In some embodiments, the user-related parameter indicates whether or not the headset wearable speaker is being worn by a user, and wherein the functions further comprise: providing a user present indication responsive to determining that the headset wearable speaker is being worn by the user. In some embodiments, the functions further comprise: switching a call to the headset providing the audio to the speaker interface responsive to the user present indication. In some embodiments, the functions further comprise: detecting a heartbeat of the user based on the speaker return signals generated by the wearable speaker of the headset. In some embodiments, the functions further comprise: determining a heart rate of the user based on the heartbeat of the user. In some embodiments, the functions further comprise: determining a stress level of the user based on the heart rate of the user. In some embodiments, the functions further comprise: providing an indication of the stress level of the user; and providing identification information for a call handled by the user. In some embodiments, the functions further comprise: monitoring a health of the user based on a plurality of the heart rates of the user.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present disclosure provide detection of a user of a wearable speaker. That is, rather than merely detecting the presence of the wearable speaker, these embodiments confirm that the wearable speaker is being worn by a user. The inventor has discovered that signals produced by a wearable speaker may be used to detect the presence of the user, that is, that a user is wearing the wearable speaker. These signals, referred to herein as "speaker return signals," may be produced by the wearable speaker responsive to movements of the user. These movements may include the pulse of the user.

The disclosed wearable speaker user detection techniques have many uses. The uses described herein are presented as examples only. Other uses are contemplated as well. Responsive to an indication that the user is present, an audio switch may provide audio to the wearable speaker. For example, a call management system may switch a call to the user's headset. As another example, responsive to an indication that a headset user is present, the headset speaker may answer a call, end a call, transfer a call from the headset to a phone connected to the headset, and the like.

A heartbeat of the user may be detected based on the signals produced by the wearable speaker. As used herein, the terms "pulse" and "heartbeat" are used interchangeably. A heart rate of the user may be determined based on the heartbeat of the user. A stress level of the user may be determined based on the heart rate of the user. The stress level of the user may be combined with identification information for a call handled by the user to create a call report. Other features are contemplated as well. Embodiments presented herein are sometimes described in terms of headsets. However, the techniques described herein are also applicable to any wearable speaker or device including a wearable speaker. Such devices may include headphones, earbuds, and the like.

Figure 1:
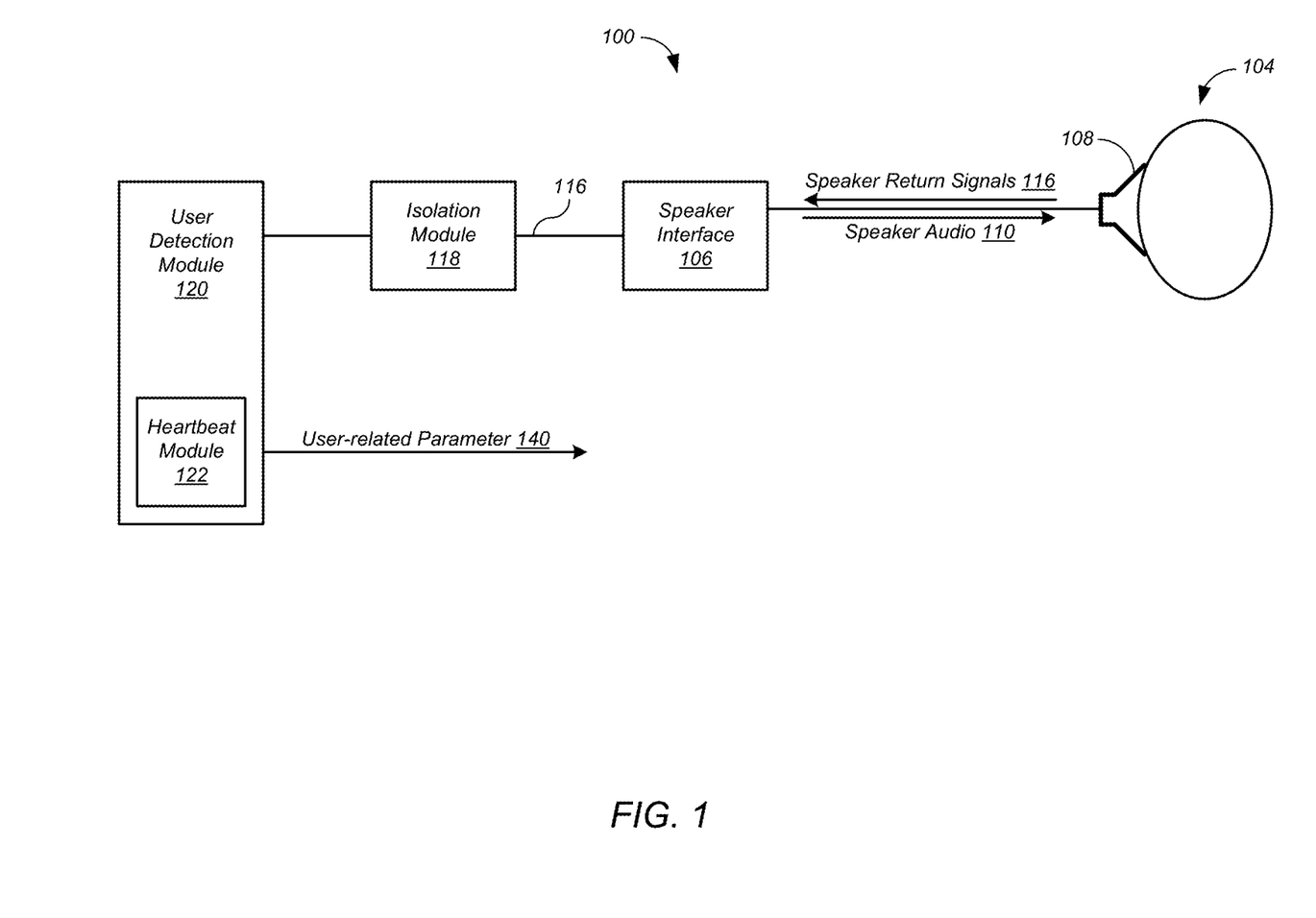
FIG. 1 shows elements of a wearable speaker user detection system according to one embodiment.

FIG. 1 shows elements of a wearable speaker user detection system 100 according to one embodiment. Although in the described embodiment elements of the wearable speaker user detection system 100 are presented in one arrangement, other embodiments may feature other arrangements. For example, elements of wearable speaker user detection system 100 can be implemented in hardware, software, or combinations thereof. As another example, various elements of the wearable speaker user detection system 100 may be implemented as one or more digital signal processors. In the present disclosure, the wearable speaker user detection system 100 is sometimes described in terms of an agent in a call center. However, the techniques described herein are applicable to any wearable speaker user in any environment.

Referring to FIG. 1, the wearable speaker user detection system 100 may include a wearable speaker 108, a speaker interface 106, an isolation module 118, and a user detection module 120. The user detection module 120 may include a heartbeat module 122. The wearable speaker 108 may be worn by a user 104. For example, the wearable speaker 108 may be part of a headset, headphones, earbud, or the like. One or more other elements of the wearable speaker user detection system 100 may be incorporated in the headset, headphones, earbud, or the like as well.

The wearable speaker 108 may be any sort of speaker capable of being worn and performing the functions described herein. For example, the wearable speaker 108 may be an "over-the-ear" type of speaker, an "earbud" type of speaker, or the like. The wearable speaker 108 receives speaker audio 110 from the speaker interface 106. The speaker audio 110 may be any sort of audio. For example, the speaker audio 110 may include audio of a call, music, game audio, or the like. The connection between the wearable speaker 108 and the speaker interface 106 may take any form. For example, the connection may be wired, wireless, optical, or the like.

The speaker interface 106 also receives speaker return signals 116 from the wearable speaker 108. The wearable speaker 108 may be any sort of speaker, for example such as an electro-acoustic speaker. An electro-acoustic speaker 108 generally includes a moving coil fitted to a cone. The coil is located within a magnetic field. An audio signal 110 fed to the coil causes the coil and cone to move, generating sound. This action may be reversed. That is, audio stimulus causes the cone and coil to move. This in turn induces an electrical output signal 116 from the coil. That is, the speaker return signals 116 are generated by the wearable speaker 108. With electro-acoustic speakers, the speaker return signal 116 is an electrical signal. But in other types of speakers, the speaker return signal 116 may take other forms.

The speaker return signals 116 may be generated responsive to movements of the user 104. These movements may include talking, chewing, sniffling, adjusting the position of the wearable speaker 108, and the like. These movements may also include the pulse or heartbeat of the user 104. The heartbeat pressure pulse of the user 104 is a very distinctive repeating low frequency burst, with a cyclic sub-audible waveform caused by the tissues surrounding the ear of the user 104 expanding and contracting with each pulse. The source impedance of the speaker drive circuitry providing the speaker audio 110 may be kept high, for example at low frequencies. If the source impedance of the speaker drive circuitry is too low, the level of the speaker return signals 116 may be reduced.

The wearable speaker user detection system 100 may include an isolation module 118. The isolation module 118 is configured to isolate the speaker return signals 116. In particular, the isolation module 118 is configured to separate the speaker return signals 116 from any speaker audio 110. In some embodiments, the isolation module 118 includes an amplifier. The amplifier may have a gain of approximately 110 dB, for example. In some embodiments, the isolation module 118 includes a band pass filter. The band pass filter may have a pass-band from approximately 17 Hz to approximately 23 Hz. The band pass filter may be implemented with analog filter components, with a digital signal processor, or with a combination thereof. In some embodiments, the isolation module 118 includes a directional splitter. The directional splitter is configured to separate signals based on their direction of transmission. Accordingly, the directional splitter allows the speaker return signals 116 to be monitored while speaker audio 110 is being driven to the wearable speaker 108. In some embodiments, the isolation module 118 includes a switch. The switch is configured to pass the speaker return signals 116 to the isolation module 118 only when no speaker audio 110 is being driven to the wearable speaker 108. This technique ensures that no speaker audio 110 is processed by the user detection module 120. In some embodiments, the switch is operated responsive to detecting the presence of the speaker audio 110. In some embodiments, the switch is operated responsive to receipt of a control message that indicates the speaker audio 110 is present. Other approaches to operating the switch are contemplated.

The wearable speaker user detection system 100 may include a user detection module 120. The user detection module 120 is configured to determine a user-related parameter 140. For example, the user-related parameter 140 may indicate whether or not the wearable speaker 108 is being worn by a user 104 based on the speaker return signals 116 received by the speaker interface 106 from the wearable speaker 108. The user detection module 120 may employ the speaker return signals 116 as processed by the isolation module 118, the speaker return signals 116 without such processing, or both. Any signal processing algorithm may be used to detect the user 104. For example, the algorithm may compare the received speaker return signals 116 with a reference signal, with previously received speaker return signals 116, or the like.

In some embodiments, the user detection module 120 includes a heartbeat module 122. The heartbeat module 122 is configured to detect a heartbeat of the user 104 based on the speaker return signals 116. The heartbeat module 122 may employ the speaker return signals 116 as processed by the isolation module 118, the speaker return signals 116 without such processing, or both. Any signal processing algorithm may be used to detect the heartbeat. In embodiments that include a heartbeat module 122, the user detection module 120 determines the user-related parameter 140 based on the heartbeat detected by the heartbeat module 122.

Figure 2:
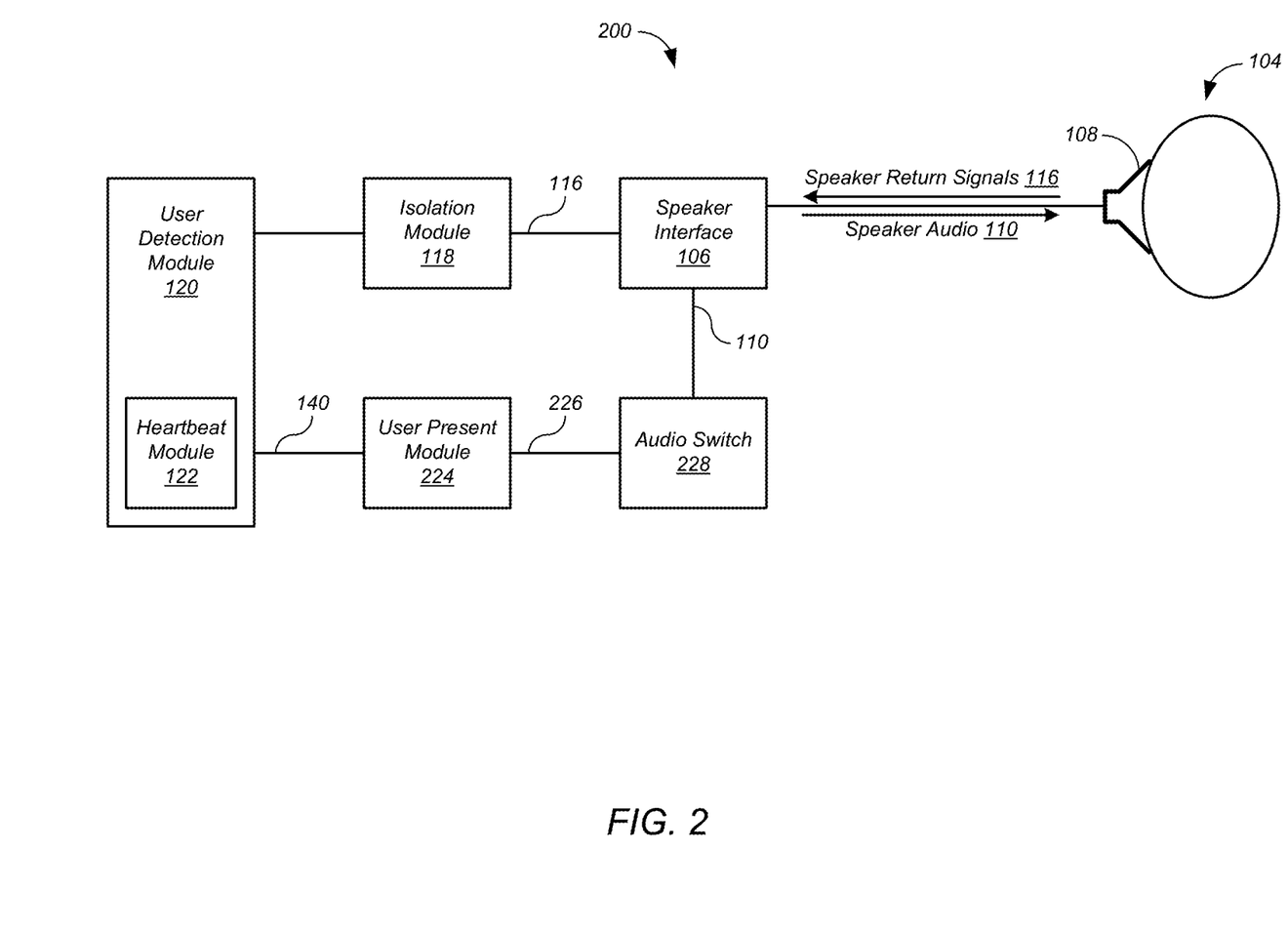
FIG. 2 shows elements of an audio system that includes elements of the wearable speaker user detection system of FIG. 1 according to one embodiment.

FIG. 2 shows elements of an audio system 200 that includes elements of the wearable speaker user detection system 100 of FIG. 1 according to one embodiment. Although in the described embodiment elements of the audio system 200 are presented in one arrangement, other embodiments may feature other arrangements. For example, elements of the audio system 200 can be implemented in hardware, software, or combinations thereof. As another example, various elements of the audio system 200 may be implemented as one or more digital signal processors.

Referring to FIG. 2, the audio system 200 may include elements of the wearable speaker user detection system 100 of FIG. 1. The wearable speaker 108 may be part of a headset, headphone, earbud, or the like. One or more other elements of the audio system 200 may be incorporated in the headset as well. In addition, the audio system 200 may include a user present module 224 and an audio switch 228. The user present module 224 is configured to provide a user present indication 226 responsive to the user-related parameter 140. For example, the user present module 224 may provide the user present indication 226 responsive to the user detection module 120 determining that the wearable speaker 108 is being worn. The audio switch 228 is configured to provide the speaker audio 110 to the speaker interface 106 responsive to the user present indication 226.

Figure 3:
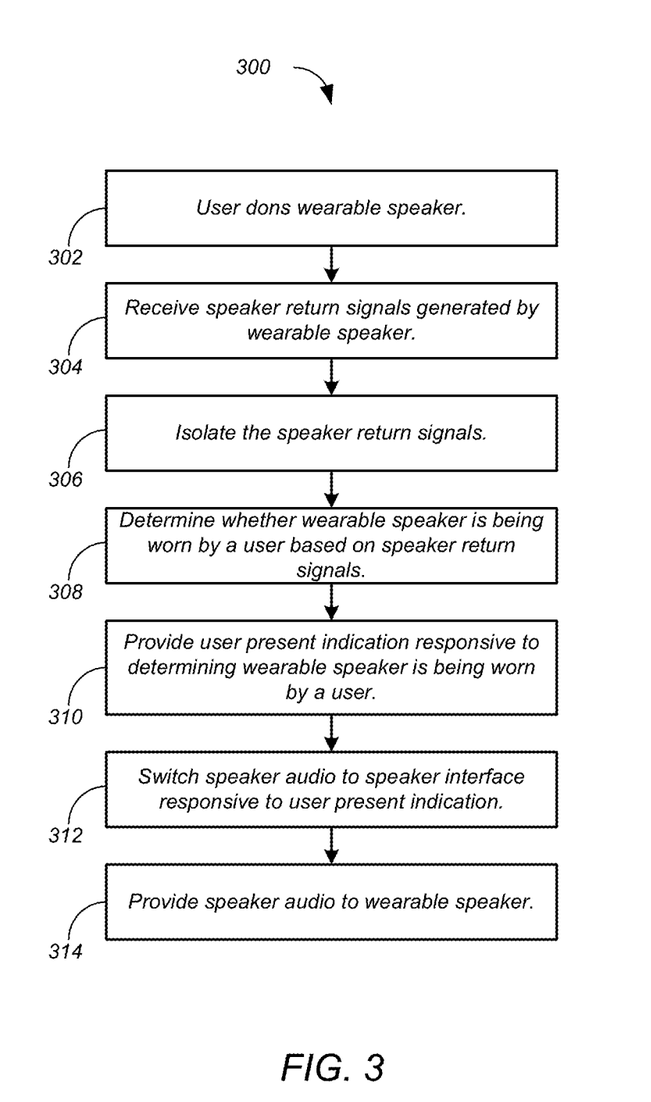
FIG. 3 shows a process for the audio system of FIG. 2 according to one embodiment.

FIG. 3 shows a process 300 for the audio system 200 of FIG. 2 according to one embodiment. Although in the described embodiments the elements of process 300 are presented in one arrangement, other embodiments may feature other arrangements. For example, in various embodiments, some or all of the elements of process 300 can be executed in a different order, concurrently, and the like. Also some elements of process 300 may not be performed, and may not be executed immediately after each other. In addition, some or all of the elements of process 300 can be performed automatically, that is, without human intervention.

Referring to FIG. 3, at 302, the user 104 dons the wearable speaker 108. For example, the user 104 dons a headset that includes the wearable speaker 108. Responsive to the user 104 donning the wearable speaker 108, the headset user detection system 100 detects the user 104 and provides the user-related parameter 140. In this example, the user-related parameter 140 indicates that the wearable speaker 108 is being worn. In particular, at 304, the speaker interface 106 receives speaker return signals 116 generated by the wearable speaker 108. At 306, isolation module 118 isolates the speaker return signals 116. At 308, the user detection module 120 determines whether the wearable speaker 108 is being worn by a user 104 based on the speaker return signals 116. At 310, the user present module 224 provides the user present indication 226 responsive to the user detection module 120 determining that the wearable speaker 108 is being worn by a user 104. At 312, the audio switch 228 switches the speaker audio 110 to the speaker interface 106 responsive to the user present module 224 providing the user present indication 226. At 314, the speaker interface 106 provides the speaker audio 110 to the wearable speaker 108.

Figure 4:
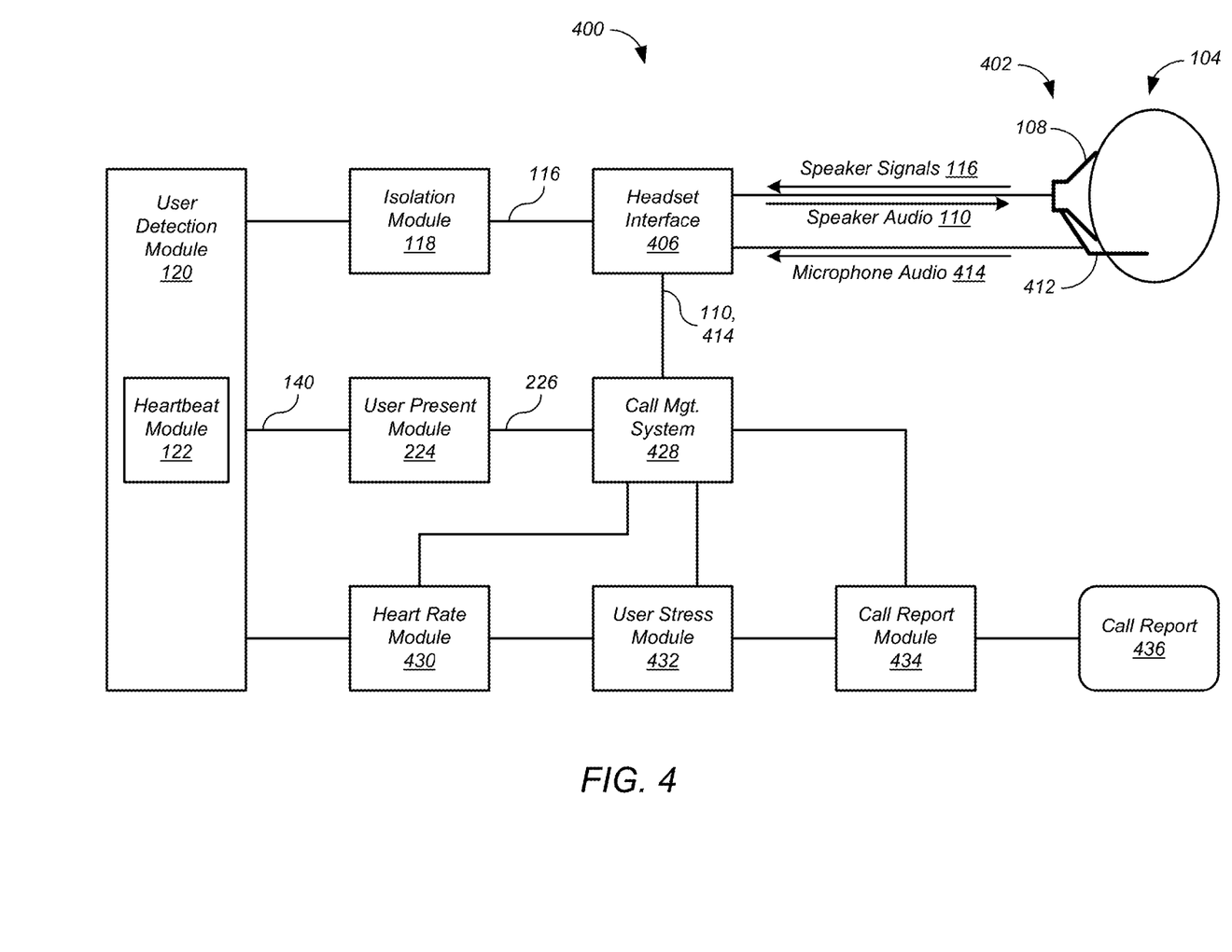
FIG. 4 shows elements of a call center that includes elements of the wearable speaker user detection system of FIG. 1 and the audio system of FIG. 2 according to one embodiment.

Some embodiments are implemented in a call center. FIG. 4 shows elements of a call center 400 that includes elements of the wearable speaker user detection system 100 of FIG. 1 and the audio system 200 of FIG. 2 according to one embodiment. Although in the described embodiment elements of the call center 400 are presented in one arrangement, other embodiments may feature other arrangements. For example, elements of the call center 400 can be implemented in hardware, software, or combinations thereof.

Referring to FIG. 4, the call center 400 may include elements of the wearable speaker user detection system 100 of FIG. 1 and the audio system 200 of FIG. 2. The call center 400 may also include a headset 402, a headset interface 406, a call management system 428, a heart rate module 430, a user stress module 432, and a call report module 434. As used herein, the term "headset" refers to a device that includes one or more wearable speakers 108, and that may, or may not, include a microphone. For example, the headset 402 of FIG. 4 includes a wearable speaker 108 and a microphone 412. The microphone 412 provides microphone audio 414 to the headset interface 406. The connection between the headset 402 and the headset interface 406 may take any form. For example, the connection may be wired, wireless, optical, or the like. One or more other elements of the call center 400 may be incorporated in the headset as well.

The call center 400 may also include a call management system 428. The call management system 428 is configured to switch calls to the headset interface 406, and thus to the headset 402, responsive to the user present indication 226. This arrangement ensures that a call is switched to the user 104 only when the user 104 is available to take the call.

In some embodiments, the call center 400 includes a heart rate module 430. The heart rate module 430 is configured to determine a heart rate of the user 104 based on the heartbeat of the user 104 determined by the heartbeat module 122. The heart rate module 430 may employ any algorithm to determine the heart rate of the user 104. The heart rate module 430 may report the heart rate of the user 104 to the call management system 428. The call management system 428 may employ the reported heart rates to monitor the health of the user 104. For example, the call management system 428 may compare heart rates taken over a period of time to detect any significant changes in the heart rates over that period of time. The reported heart rates may also be displayed to the user 104, for example on a computer monitor.

In some embodiments, the call center 400 includes a user stress module 432. The user stress module 432 is configured to determine a stress level of the user 104 based on the heart rate of the user 104 determined by the heart rate module 430. For example, an elevated heart rate may indicate a high user stress level. The user stress module 432 may employ any algorithm to determine the stress level of the user 104. The user stress module 432 may report the stress level of the user 104 to the call management system 428. The call management system 428 may employ the reported stress levels to monitor the health of the user 104. The reported stress levels may also be displayed to the user 104, for example on a computer monitor.

An elevated stress level of a call center agent 104 may be the result of a call handled by the agent. Call center operators may find it desirable to obtain a report of such calls. In some embodiments, the call center 400 includes a call report module 434. The call report module 434 is configured to provide a call report 436. The call report 436 may be provided responsive to an elevated stress level of a call center agent 104. The call report 436 may include an indication of the stress level of the agent 104, identification information for a call handled by the agent 104, and the like. The identification information may include the phone number of the caller, name of the agent 104, time of the call, and the like.

Figure 5:
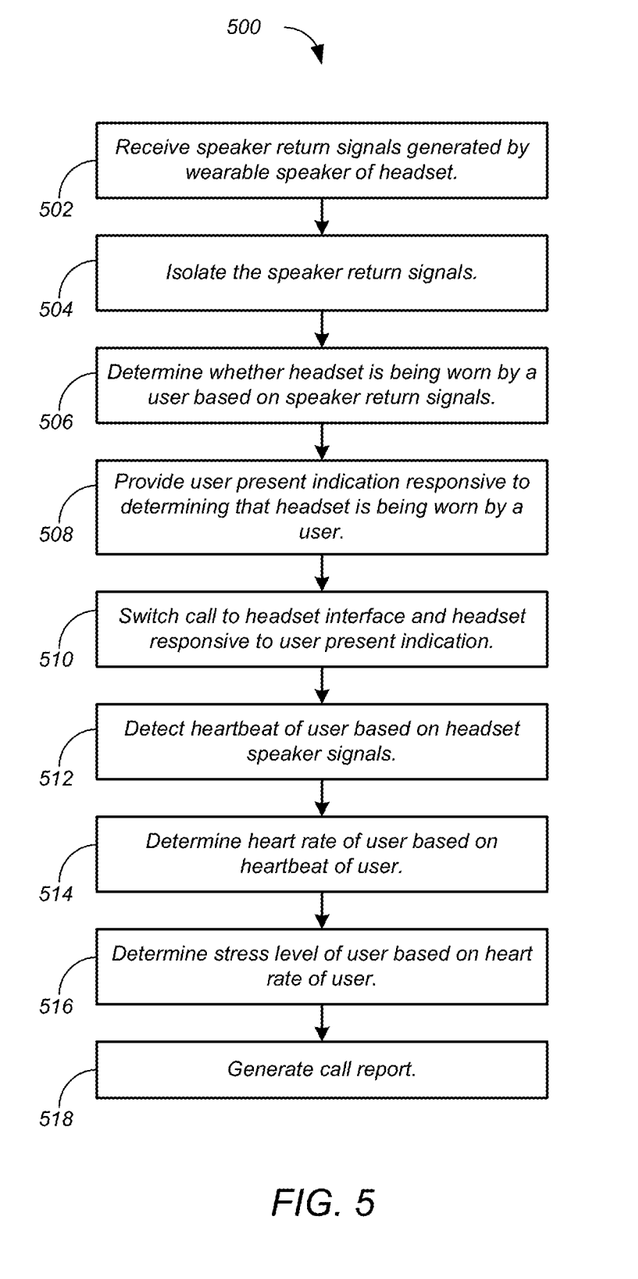
FIG. 5 shows a process for the call center of FIG. 4 according to one embodiment.

FIG. 5 shows a process 500 for the call center 400 of FIG. 4 according to one embodiment. Although in the described embodiments the elements of process 500 are presented in one arrangement, other embodiments may feature other arrangements. For example, in various embodiments, some or all of the elements of process 500 can be executed in a different order, concurrently, and the like. Also some elements of process 500 may not be performed, and may not be executed immediately after each other. In addition, some or all of the elements of process 500 can be performed automatically, that is, without human intervention.

Referring to FIG. 5, at 502, the headset interface 406 receives speaker return signals 116 generated by the wearable speaker 108 of the headset 402. The speaker return signals 116 may be generated by the wearable speaker 108 of the headset 402 responsive to a pulse of the user 104, other movement of the user 104, movement of the headset 402, ambient noise, or the like. At 504, the isolation module 118 isolates the speaker return signals 116.

Figure 6:
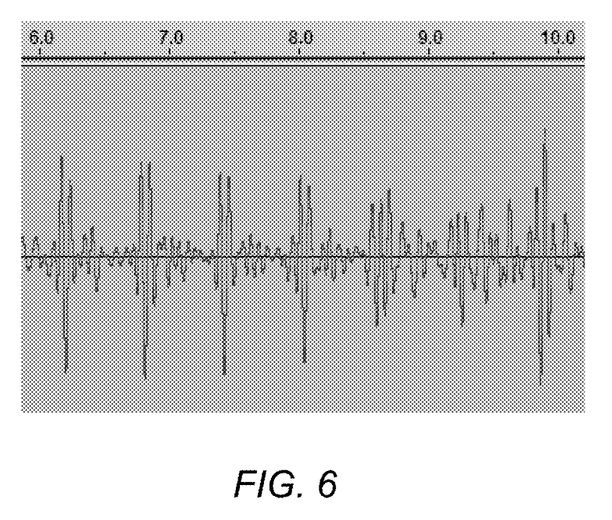
FIG. 6 shows speaker return signals generated by a speaker of a headset being worn by a user.
Figure 7:
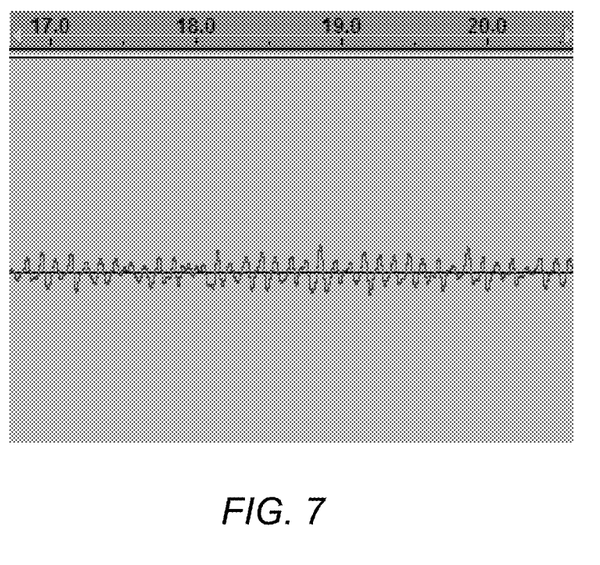
FIG. 7 shows speaker return signals generated by the speaker of the same headset, but with the headset lying on a desk.

At 506, the user detection module 120 determines whether the headset 402 is being worn by a user 104 based on the speaker return signals 116. In one example, the speaker return signals 116 represent a heartbeat of the user 104. FIG. 6 shows speaker return signals 116 generated by a speaker 108 of a headset 402 being worn by a user 104, after isolation of the speaker return signals 116. The horizontal axis represents time in seconds. The headset 402 is being worn by a user 104, with the heartbeat of the user 104 being clearly visible. FIG. 7 shows speaker return signals 116 generated by the speaker 108 of the same headset 402 with the same isolation, but with the headset 402 lying on a desk. It is easy to tell that the headset 402 is not being worn by a user 104 in FIG. 7.

At 508, the user present module 224 provides the user present indication 226 responsive to the user detection module 120 determining that the headset 402 is being worn by a user 104. At 510, the call management system 428 switches a call to the headset interface 406 and the headset 402 responsive to the user present module 224 providing the user present indication 226.

At 512, the heartbeat module 122 detects a heartbeat of the user 104 based on the speaker return signals 116 generated by the speaker 108 of the headset 402. At 514, the heart rate module 430 determines a heart rate of the user 104 based on the heartbeat of the user 104 determined by the heartbeat module 122. At 516, the user stress module 432 determines a stress level of the user 104 based on the heart rate of the user 104 determined by the heart rate module 430. For example, the user stress module 432 may compare the heart rate of the user 104 to a set of reference heart rates, where each of the reference heart rates is associated with a respective user stress level.

At 518, the call report module 434 generates a call report 436. The call report module 434 may generate the call report 436 responsive to the user stress module 432 detecting a high user stress level. The call report 436 provides an indication of the stress level of the user. The call report 436 may also provide identification information for the call handled by the user. The identification information for the call may be provided by the call management system 428. The call report 436 may include other information such as identification information for the user 104, date and time of day of the call, and the like. The call report 436 may take any form. For example, the call report 436 may be a digital message, paper print-out, computer display, or the like.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. An apparatus comprising:
   a speaker interface configured to provide audio to a wearable speaker and to receive speaker return signals generated by the wearable speaker;
   a user detection module configured to determine a user-related parameter based on the speaker return signals received by the speaker interface from the wearable speaker, wherein the user-related parameter indicates whether or not the wearable speaker is being worn by a user; and
   a user present module configured to provide a user present indication responsive to the user detection module determining that the wearable speaker is being worn.

2. The apparatus of claim 1, further comprising:
   an audio switch configured to provide the audio to the speaker interface responsive to the user present indication.

3. The apparatus of claim 1, wherein the user detection module comprises:
   a heartbeat module configured to detect a heartbeat of the user based on the speaker return signals received by the speaker interface from the wearable speaker;
   wherein the user detection module determines the user-related parameter based on the heartbeat detected by the heartbeat module.

4. The apparatus of claim 3, further comprising:
   a heart rate module configured to determine a heart rate of the user based on the heartbeat of the user.

5. The apparatus of claim 4, further comprising:
   a user stress module configured to determine a stress level of the user based on the heart rate of the user.

6. The apparatus of claim 5, further comprising:
   a call module configured to provide
   i) an indication of the stress level of the user, and
   ii) identification information for a call handled by the user.

7. The apparatus of claim 4, further comprising:
   a call management system configured to monitor a health of the user based on a plurality of the heart rates of the user.

8. The apparatus of claim 1, further comprising:
   a headset, wherein the headset comprises
   the wearable speaker, and
   the user detection module.

9. The apparatus of claim 8, wherein the audio is first audio, and wherein the headset further comprises:
   a microphone configured to provide second audio to the speaker interface.

10. A method comprising:
    providing, by a processor, audio to a wearable speaker;
    receiving, by the processor, speaker return signals generated by the wearable speaker;
    determining, by the processor, a user-related parameter based on the speaker return signals generated by the wearable speaker, wherein the user-related parameter indicates whether or not the wearable speaker is being worn by a user; and
    providing, by the processor, a user present indication responsive to determining that the wearable speaker is being worn by the user.

11. The method of claim 10, further comprising:
    providing the audio to the speaker interface responsive to the user present indication.

12. The method of claim 10, further comprising:
    detecting a heartbeat of the user based on the speaker return signals generated by the wearable speaker.

13. The method of claim 12, further comprising:
    determining a heart rate of the user based on the heartbeat of the user.

14. The method of claim 13, further comprising:
    determining a stress level of the user based on the heart rate of the user.

15. The method of claim 14, further comprising:
    providing an indication of the stress level of the user; and
    providing identification information for a call handled by the user.

16. The method of claim 15, further comprising:
    monitoring a health of the user based on a plurality of the heart rates of the user.

17. Computer-readable non-transitory media embodying instructions executable by a computer to perform functions comprising:
    determining a user-related parameter based on speaker return signals generated by a wearable speaker, wherein the user-related parameter indicates whether or not the wearable speaker is being worn by a user, and
    providing a user present indication responsive to determining that the wearable speaker is being worn by the user.

18. The computer-readable non-transitory media of claim 17, wherein the functions further comprise:
    providing the audio to the speaker interface responsive to the user present indication.

19. The computer-readable non-transitory media of claim 17, wherein the functions further comprise:
    detecting a heartbeat of the user based on the speaker return signals generated by the wearable speaker.

20. The computer-readable non-transitory media of claim 19, wherein the functions further comprise:
    determining a heart rate of the user based on the heartbeat of the user.

21. The computer-readable non-transitory media of claim 20, wherein the functions further comprise:
    determining a stress level of the user based on the heart rate of the user.

22. The computer-readable non-transitory media of claim 21, wherein the functions further comprise:
    providing an indication of the stress level of the user; and
    providing identification information for a call handled by the user.

23. The computer-readable non-transitory media of claim 22, wherein the functions further comprise:
    monitoring a health of the user based on a plurality of the heart rates of the user.

* * * * *